(No Model.)
J. F. EBERSOLE.
COMBINED PULVERIZER, WEEDER, AND CULTIVATOR.
No. 568,563. Patented Sept. 29, 1896.
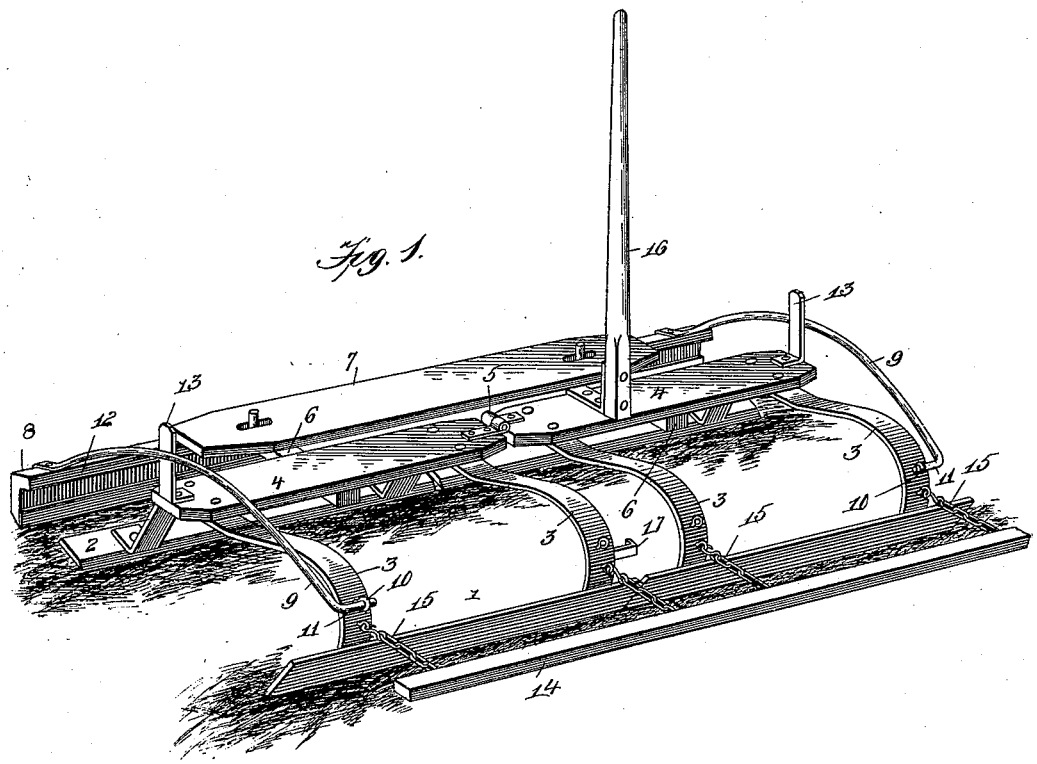
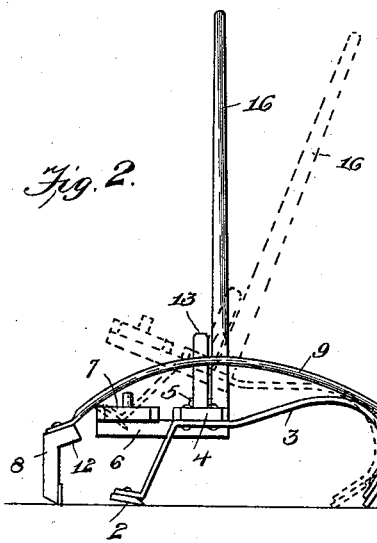
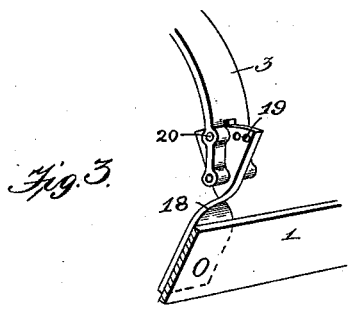
Witnesses
John C. Shaw
V. B. Hillyard
Inventor
John F. Ebersole,
By his Attorneys,
C. A. Snow & Co.

UNITED STATES PATENT OFFICE.

JOHN F. EBERSOLE, OF SALEM, OREGON.

COMBINED PULVERIZER, WEEDER, AND CULTIVATOR.

SPECIFICATION forming part of Letters Patent No. 568,563, dated September 29, 1896.

Application filed August 28, 1895. Serial No. 560,809. (No model.)

*To all whom it may concern:*

Be it known that I, JOHN F. EBERSOLE, a citizen of the United States, residing at Salem, in the county of Marion and State of Oregon, have invented a new and useful Combined Pulverizer, Weeder, and Cultivator, of which the following is a specification.

The purpose of the present invention is the provision of an agricultural implement for pulverizing, weeding, and cultivating the soil in the preparation of the latter for the reception of seed or grain; and the object of the improvement is the construction of an implement for the purposes aforesaid which is under the control of the driver and which can be manipulated to free it of weeds, trash, and other accumulations without requiring the stopping of the team or the loosening of any fastenings, and which will enable the driver to utilize his weight for holding the weeding devices in operative relation by a variable pressure, the latter being obtained by means of the driver shifting his position, as will appear more fully hereinafter.

Other objects and advantages are contemplated and will be apparent from the subjoined description; and the improvement consists of the novel features and the peculiar combination of the parts, which hereinafter will be more particularly set forth and claimed and which are illustrated in the accompanying drawings, in which—

Figure 1 is a perspective view of an agricultural implement constructed in accordance with this invention. Fig. 2 is a side elevation thereof, showing by dotted lines the tilted position of the weeder when freeing the latter of trash and other accumulations. Fig. 3 shows a modification which provides a hinge and adjustable connection between the clod-crushing bar and the side arches.

The implement comprises in its organization a series of similar sections, each of which consists of a clod-crushing bar 1, a weeding-blade 2, and connecting side arches 3, the latter extending in parallel relation and having their pendent end portions inclining rearwardly and having the clod-crushing bar and the weeding-blade firmly attached in any desired manner to their respective lower extremities. The clod-crushing bar 1 inclines rearwardly from its top edge, so as the better to engage with and crush the clods as the implement is drawn over the field. The weeding-blade 2 inclines slightly to the horizontal, and its front edge is sharpened so as to cut the weeds, stubble, grass, and other growths, and this blade will be sufficiently stout to withstand the character of work for which it is designed. A transversely-disposed bar 4 connects the horizontal portions of the side arches 3 near their rear ends and forms a support for the driver when the latter desires to ride and to utilize his weight for holding the clod-crushing bar and the weeding-blade to their work. When connecting the sections in series, advantage is taken of the transverse bars 4 for attachment thereto of the members forming the hinge-joint 5, by means of which the said sections are coupled together.

By providing a series of sections and connecting the same by hinge-joints in the manner just described, the individual sections can rise and fall and adapt themselves to the roll or condition of the ground, thereby enabling the implement to treat the same the full width of the path occupied by the implement in its travel over the ground. Arms 6 project rearwardly from the transverse bars 4 and support at their rear extremities a plate 7, upon which the driver perches when it is required to throw an increased weight upon the weeding-blade 2, and this weight or pressure upon the weeding-blade can be varied by a proper adjustment of the weight upon either bar 4 and the plate 7, as will be readily understood. The rearwardly-extending arms 6 have vertical extensions, which operate in slots near the ends of the plate 7, thereby forming a loose connection, so as to admit of the individual sections comprising the implement rising and falling to accommodate themselves to the surface of the ground over which the implement is passing.

A supplemental crushing and leveling bar 8 is arranged to operate in the rear of the weeding-blades 2, and is of a length corresponding to the combined length of the several weeding-blades 2, and this bar 8 is connected by rods 9 with the front portions of the outermost side arches 3, the latter having eyes 10 for the reception of the front bent ends 11 of the said rods 9. This crushing and leveling bar 8 is provided at its top edge with a forwardly-extending portion 12, which prevents the earth and small clods from riding over the said bar, and the latter is rearwardly inclined at its lower edge, so as to facilitate the passage thereunder of the soil to be leveled and pulverized. Standards 13 rise vertically from the outer ends of the transverse bars 4 and engage with the inner sides of the rods 9 and guide the latter in their vertical movements when the implement is performing efficient service.

A draft-bar 14 is connected by a series of chains 16 with the front portions of the arches 3, and the team for drawing the implement over the field is hitched thereto in the usual manner. In order to facilitate the tilting of the sections, so as to clear the weeding-blades of foreign matter, one of the transverse bars 4 is supplied with an upright lever 16, which is adapted to be operated by the driver to attain the desired end. A step 17 is located at the front end of one of the side arches, and when it is required to tilt the sections for clearing the same of accumulations the driver perches upon the said step 17 and at the same time operates the lever 16, thereby elevating the rear ends of the sections and lifting the weeding-blades, so as to free the same from the foreign matter which may be adhering thereto. During the tilting of the sections the weight of the implement is supported by the bars 1 and 8, and the upward movement of the rear ends of the sections is limited by the outer ends of the weeding-blades engaging with the rods 9, as shown most clearly by the dotted lines in Fig. 2.

If preferred for any reason, one of the sections can be used singly for pulverizing, leveling, and cultivating the soil, and when the sections are coupled in series, as shown, the supplemental bar 8 serves to pulverize and level the ground in the rear of the weeding-blades.

In some instances it may be preferable to provide an adjustable connection between the clod-crushing bar 1 and its supporting-arches, so as to make provision for varying the inclination of the said clod-crushing bar to adapt the implement to the nature of the soil to be tilled or leveled. In Fig. 3 is shown one of the many ways of attaining this end, and this view illustrates the bar 1 provided with a plate 18, which has its upper end formed with a series of openings 19, arranged on the arc of a circle concentric with the pivotal connection of the said plate with the side arch 3, and a pin 20 is provided to pass through openings in the bifurcated portions of the terminal end of the side arch and through one of the series of openings 19, as will be readily understood.

An implement constructed substantially as herein specified is susceptible of a variety of uses, and the disposition of the parts can be modified according to the special requirement for which the implement is constructed. Therefore in the embodiment of the invention it will be understood that various changes in the form, proportion, and minor details of construction may be resorted to without departing from the spirit or sacrificing any of the advantages of this invention.

What is claimed is—

1. An agricultural implement for the purposes set forth, comprising similar side arches having their front ends rearwardly inclined and their rear terminals upwardly deflected, a clod-crushing bar secured to the front ends of the arches, a weeding-blade extending parallel with the clod-crushing bar and secured to the rear terminals of the said arches, and a transverse bar connecting the horizontal portions of the arches, substantially as set forth for the purpose described.

2. An agricultural implement for the purposes specified, comprising a clod-crushing bar arranged to incline rearwardly at its lower edge, a weeding-blade having its front edge sharpened and disposed at a slight inclination to the horizontal, side arches having their end portions rearwardly inclined and firmly attached respectively to the clod-crushing bar and the weeding-blade, and a transversely-disposed bar connecting the horizontal portions of the side arches at their rear ends, substantially as and for the purpose described.

3. An agricultural implement for the purposes set forth, comprising a series of similarly-constructed sections, each having a clod-crushing bar and a weeding-blade, and the said sections being coupled together by hinge connections, a supplemental crushing and leveling bar arranged to operate in the rear of the weeding-blades and having connection with the front ends of the said sections, and a lever attached to one of the sections and adapted to be operated to tilt the same to free the weeding-blade of trash and accumulations, substantially in the manner set forth.

4. In an agricultural implement, the combination of a series of similarly-constructed sections arranged side by side, each comprising a clod-crushing bar, a weeding-blade, and intermediate connections, arms extending rearwardly from the sections and having vertical extensions, a plate supported by the rear ends of the said arms and having slots to receive the said vertical extensions, and disposed to travel upon the ground and to extend over the joint between the sections, and adapted to receive the weight of the driver, substantially as set forth, for the purpose described.

5. The combination, in an agricultural implement, of a series of sections arranged side by side, each comprising a clod-crushing bar and a weeding-blade, and a supplemental crushing and leveling bar arranged to operate in the rear of the weeding-blade and having pivotal connection by means of rods with the front ends of the sections, substantially in the manner set forth, for the purpose described.

6. The herein-described agricultural implement for the purposes specified, comprising similarly-constructed sections, each comprising a clod-crushing bar, a weeding-blade, side arches connecting the clod-crushing bar and weeding-blade, and a transversely-disposed bar, the said sections being coupled together by hinge-joints between said transversely-disposed bars, standards rising vertically from the outer ends of the transverse bars, a plate supported in the rear of and having connection with the aforementioned transverse bars, a step attached to the front end of one of the side arches, a supplemental crushing and leveling bar, disposed to operate in the rear of the weeding-blade and having rods extending forwardly from their ends and pivotally connected with the front end of the said sections and guided in their movements by the said vertical standards, an upright lever secured to one of the aforesaid transversely-disposed bars, and a draft-bar having attachment with the front ends of the several arches, substantially as set forth, for the purpose described.

In testimony that I claim the foregoing as my own I have hereto affixed my signature in the presence of two witnesses.

JOHN F. EBERSOLE.

Witnesses:
WILLIAM JAMES CULVER,
GEORGE B. GRAY.